US010642725B2

(12) United States Patent
Abdirashid et al.

(10) Patent No.: US 10,642,725 B2
(45) Date of Patent: *May 5, 2020

(54) AUTOMATED TEST GENERATION FOR MULTI-INTERFACE ENTERPRISE VIRTUALIZATION MANAGEMENT ENVIRONMENT

(71) Applicant: INTERNATIONAL BUSINESS MACHINES CORPORATION, Armonk, NY (US)

(72) Inventors: Mohammad Abdirashid, Poughkeepsie, NY (US); Ali Y. Duale, Poughkeepsie, NY (US); Tariq Hanif, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 15/827,130

(22) Filed: Nov. 30, 2017

(65) Prior Publication Data

US 2018/0081795 A1 Mar. 22, 2018

Related U.S. Application Data

(63) Continuation of application No. 14/927,583, filed on Oct. 30, 2015, now Pat. No. 9,858,177.

(51) Int. Cl.
*G06F 11/36* (2006.01)
*G06F 11/263* (2006.01)
(Continued)

(52) U.S. Cl.
CPC ...... *G06F 11/3692* (2013.01); *G06F 9/45558* (2013.01); *G06F 11/1497* (2013.01);
(Continued)

(58) Field of Classification Search
CPC .......... G06F 11/3692; G06F 11/3684; G06F 11/3688; G06F 11/1497; G06F 11/1629;
(Continued)

(56) References Cited

U.S. PATENT DOCUMENTS 5,513,315 A 4/1996 Tierney et al.
5,600,789 A 2/1997 Parker et al.
(Continued)

FOREIGN PATENT DOCUMENTS

CN 103475538 A 12/2013

OTHER PUBLICATIONS

Balasubramanian et al. Functional test automation method for e.g. device management application, involves logging test step execution and results in file, and updating test status and test logs in test repository against test. RD54402A. Aug. 10, 2009.*
(Continued)

*Primary Examiner* — Paul Contino
(74) *Attorney, Agent, or Firm* — Cantor Colburn LLP; William Kinnaman

(57) ABSTRACT

Embodiments for automated testing of a virtualization management system are described. According to one aspect, a method includes generating a test case including a plurality of instances of commands and sending the test case to a plurality of interfaces supported by the virtualization management system. The method also includes generating a response file corresponding to each command in the test case. The method also includes comparing results from each interface to an instance of a command and in response to the results from each interface being identical, storing, the results in the response file corresponding to the command. The method also includes reporting an error in response to the results from each interface of the virtualization management system not being identical. The present document
(Continued)

further describes examples of other aspects such as systems, computer products.

20 Claims, 7 Drawing Sheets

(51) Int. Cl.
*G06F 11/22* (2006.01)
*G06F 11/16* (2006.01)
*G06F 11/14* (2006.01)
*G06F 11/34* (2006.01)
*G06F 9/455* (2018.01)

(52) U.S. Cl.
CPC ...... *G06F 11/1629* (2013.01); *G06F 11/1641* (2013.01); *G06F 11/2205* (2013.01); *G06F 11/2221* (2013.01); *G06F 11/263* (2013.01); *G06F 11/3457* (2013.01); *G06F 11/3672* (2013.01); *G06F 11/3684* (2013.01); *G06F 11/3688* (2013.01); *G06F 9/45533* (2013.01); *G06F 2009/45579* (2013.01); *G06F 2009/45591* (2013.01)

(58) Field of Classification Search
CPC ............. G06F 11/1641; G06F 11/2221; G06F 11/3457; G06F 9/4533
See application file for complete search history.

(56) References Cited

U.S. PATENT DOCUMENTS

| | | | |
|---|---|---|---|
| 5,790,841 A | 8/1998 | Scherer et al. | |
| 6,002,992 A | 12/1999 | Pauwels et al. | |
| 6,452,411 B1 | 9/2002 | Miller et al. | |
| 6,480,978 B1 | 11/2002 | Roy et al. | |
| 6,662,312 B1 | 12/2003 | Keller et al. | |
| 6,668,362 B1 | 12/2003 | McIlwain et al. | |
| 7,089,534 B2 | 8/2006 | Hartman et al. | |
| 7,165,191 B1 | 1/2007 | Vakrat | |
| 7,240,316 B2 | 7/2007 | Regnier | |
| 7,401,259 B2 | 7/2008 | Bhowmik et al. | |
| 7,805,698 B1 | 9/2010 | Ferguson et al. | |
| 7,848,899 B2 | 12/2010 | Lai et al. | |
| 8,095,841 B2 | 1/2012 | Kemmerling | |
| 8,321,839 B2 | 11/2012 | Slone et al. | |
| 8,572,437 B2 | 10/2013 | Chang et al. | |
| 8,762,959 B2 | 6/2014 | Singonahalli et al. | |
| 8,862,950 B1 | 10/2014 | Ginsberg et al. | |
| 9,075,918 B1 | 7/2015 | Chandra et al. | |
| 9,225,776 B1 | 12/2015 | Kochura | |
| 9,262,396 B1 | 2/2016 | Rodriguez Valadez et al. | |
| 9,411,700 B2* | 8/2016 | Lee | G06F 11/263 |
| 9,424,169 B1* | 8/2016 | Galburt | G06F 11/3692 |
| 9,760,567 B1* | 9/2017 | Ourfalian | G06F 17/289 |
| 9,785,532 B2 | 10/2017 | Faraj | |
| 9,792,194 B2 | 10/2017 | Faraj | |
| 9,858,177 B2 | 1/2018 | Abdirashid et al. | |
| 9,959,201 B2 | 5/2018 | Abdirashid et al. | |
| 9,977,851 B2 | 5/2018 | Averill, III et al. | |
| 10,054,634 B2 | 8/2018 | Chi | |
| 10,223,487 B2 | 3/2019 | Averill, III et al. | |
| 10,248,749 B2 | 4/2019 | Averill, III et al. | |
| 2003/0103310 A1 | 6/2003 | Shirriff | |
| 2004/0041827 A1 | 3/2004 | Bischof et al. | |
| 2005/0071447 A1 | 3/2005 | Masek et al. | |
| 2005/0160433 A1* | 7/2005 | Lambert | G06F 11/3696 719/328 |
| 2006/0200789 A1 | 9/2006 | Rittman | |
| 2006/0212540 A1* | 9/2006 | Chon | G06F 11/261 709/218 |
| 2006/0233111 A1* | 10/2006 | Wright | H04B 17/0087 370/241 |
| 2007/0266137 A1 | 11/2007 | Malik | |
| 2007/0282556 A1* | 12/2007 | Achkar | G01R 31/31836 702/108 |
| 2008/0126918 A1 | 5/2008 | Boardman et al. | |
| 2009/0138853 A1 | 5/2009 | Orrick | |
| 2009/0313596 A1 | 12/2009 | Llippmann et al. | |
| 2010/0058275 A1 | 3/2010 | Polomik et al. | |
| 2011/0093773 A1* | 4/2011 | Yee | G06F 16/9577 715/235 |
| 2011/0145643 A1 | 6/2011 | Kumar et al. | |
| 2012/0174067 A1* | 7/2012 | Locker | G06F 11/3688 717/124 |
| 2013/0007772 A1* | 1/2013 | Arcudi | G06F 11/3692 719/320 |
| 2013/0024842 A1* | 1/2013 | Browne | G06F 11/3676 717/125 |
| 2013/0191105 A1* | 7/2013 | Abdirashid | G06F 11/3672 703/21 |
| 2013/0332774 A1 | 12/2013 | Sinaniglu | |
| 2014/0026122 A1 | 1/2014 | Markande et al. | |
| 2014/0052821 A1* | 2/2014 | Prasad | G06F 16/9577 709/218 |
| 2014/0081615 A1* | 3/2014 | Abdirashid | G06F 11/3672 703/21 |
| 2014/0109052 A1* | 4/2014 | Tempel | G06F 9/45558 717/124 |
| 2014/0201713 A1* | 7/2014 | Boden | G06F 11/3676 717/124 |
| 2014/0236525 A1 | 8/2014 | Chan et al. | |
| 2014/0236526 A1 | 8/2014 | Frediani et al. | |
| 2014/0237292 A1 | 8/2014 | Chan | |
| 2014/0244204 A1 | 8/2014 | Frediani | |
| 2014/0359579 A1* | 12/2014 | Cavanaugh | G06F 11/3624 717/124 |
| 2015/0026665 A1 | 1/2015 | Chen et al. | |
| 2015/0028908 A1 | 1/2015 | Kushnick et al. | |
| 2015/0227449 A1 | 8/2015 | Kuang et al. | |
| 2016/0274890 A1 | 9/2016 | Sternfeld et al. | |
| 2017/0010304 A1 | 1/2017 | Jang | |
| 2017/0010874 A1 | 1/2017 | Rosset et al. | |
| 2017/0039133 A1 | 2/2017 | Rai et al. | |
| 2017/0060713 A1 | 3/2017 | Wang | |
| 2017/0123951 A1 | 5/2017 | Abdirashid et al. | |
| 2017/0123965 A1 | 5/2017 | Abdirashid et al. | |
| 2018/0046741 A1 | 2/2018 | Averill, III et al. | |
| 2018/0165185 A1 | 6/2018 | Boshev et al. | |
| 2018/0307574 A1 | 10/2018 | Hanif et al. | |
| 2018/0307575 A1 | 10/2018 | Hanif et al. | |
| 2018/0357154 A1 | 12/2018 | Dolby et al. | |

OTHER PUBLICATIONS

List of IBM Patents or Patent Applications Treated As Related; (Appendix P), Filed Nov. 30, 2017; pp. 1-2.

Disclosed Anonymosly, "A Method and System to Recommend Tools in Testing Cloud," IP.com No. 00021366, IP.com Electronic Publication, Dec. 7, 2011, pp. 1-10.

Disclosed Anonymously, "Method and System for Implementing Hierarchical Scaling Pattern Technique in Cloud computing Environment," IP.com No. 000236101, IP.com Electronic Publication, Apr. 4, 2014, pp. 1-2.

Disclosed Anonymously, "System and Method for Assigning Test Priority in Cloud Environment", IPCOM000242989D, Sep. 6, 2015, pp. 1-5.

Viatsunaga, Andrea et al. "CloudBLAST: Combining MapReduce and Virtualization on Distributed Resources for Bioinformatics Applications," Fourth IEEE International Conference on eScience, pp. 1-8.

Reddy, P. Vijay Vardhan et al. "Evaluation of Different Hypervisors Performance in the Private Cloud with SIGAR Framework," International Journal of Advanced Computer Science and Applications vol. 5, No. 2, 2014, pp. 1-7.

Ruivo, et al. "Exploring Infiniband Hardware Virtualization in OpenNebula towards Efficient High-Performance Computing," Scientific Computing Division, Fermi National Accelerator Laboratory, 2014, pp. 1-6.

(56) References Cited

OTHER PUBLICATIONS

The University of Utah, "Design Compiler—Basic Flow," "Synopsys design compiler Cadence Encounter Digital Implementation System (EDI)," http://www.eng.utah.edu/~cs6710/slides/cs6710-syn-socx6.pdf, Oct. 23, 2006, pp. 1-12.

* cited by examiner

AUTOMATED TEST GENERATION FOR MULTI-INTERFACE ENTERPRISE VIRTUALIZATION MANAGEMENT ENVIRONMENT

DOMESTIC PRIORITY

This application is a continuation of U.S. Non-Provisional application Ser. No. 14/927,583, entitled "AUTOMATED TEST GENERATION FOR MULTI-INTERFACE ENTERPRISE VIRTUALIZATION MANAGEMENT ENVIRONMENT", filed Oct. 30, 2015, which is incorporated herein by reference in its entirety.

BACKGROUND

The present application relates to automated test-case generation, and more specifically, to automated test-case generation for a virtualization management environment.

Testing often consumes a considerable amount of time when developing software. Typically, a programming background is required to create automated tests for software applications, application programming interfaces, software development kits, web services and websites. Most test applications require users to learn a specific language to write tests. In addition, when a new instance (build, version, etc.) of a product is developed, new or modified tests may be required to ensure that the new instance of the product performs correctly. Further, the complexity and amount of work associated with system level testing of multi-interface components in a cloud-based computing infrastructure renders manual testing to become inefficient and costly as the system components and complexity increases.

SUMMARY

According to an embodiment, a method for automated testing of a virtualization management system includes generating, by a test server, a test case including a plurality of instances of commands executable by the virtualization management system. The method also includes sending, by the test server, the test case to each interface of a plurality of interfaces supported by the virtualization management system. The method also includes generating, by the test server, a response file corresponding to each unique command in the test case. The method also includes comparing, by the test server, results from each interface to an instance of a command from the test case upon execution of the instance the command by the virtualization management system. The method also includes in response to the results from each interface of the virtualization management system being identical, storing, by the test server, in the response file corresponding to the command, the results from the virtualization management system. The method also includes reporting, by the test server, an error in response to the results from each interface of the virtualization management system not being identical.

According to another embodiment, a system for automated testing of a virtualization management system includes a memory and a processor. The processor determines a number of interfaces supported by the virtualization management system; generate a test case including instances of commands executable by the virtualization management system. The processor sends the test case for execution by the virtualization management system via each of the interfaces of the virtualization management system. The processor generates a response file for each unique command in the test case, where the response file includes an entry corresponding to result of executing each instance of the unique command via each interface of the virtualization management system. The processor compares results of execution, by the virtualization management system via each interface, of a first instance of a command in the test case. In response to the results of the first instance of the command via each interface being identical, the processor appends the results to each response file in the response file corresponding to the command. In response to the results of the first instance of the command via each interface not being identical, the processor reports an error.

According to yet another embodiment, a computer product for automated testing of a virtualization management system includes computer readable storage medium. The computer readable storage medium includes computer executable instructions to determine a number of interfaces supported by the virtualization management system. The computer readable storage medium further includes computer executable instructions to generate a test case including instances of commands executable by the virtualization management system. The computer readable storage medium further includes computer executable instructions to send the test case for execution by the virtualization management system via each of the interfaces of the virtualization management system. The computer readable storage medium further includes computer executable instructions to generate a response file for each unique command in the test case, where the response file includes an entry corresponding to result of executing each instance of the unique command via each interface of the virtualization management system. The computer readable storage medium further includes computer executable instructions to compare results of execution, by the virtualization management system via each interface, of a first instance of a command in the test case. The computer readable storage medium further includes computer executable instructions to, in response to the results of the first instance of the command via each interface being identical, append the results to each response file in the response file corresponding to the command. The computer readable storage medium further includes computer executable instructions to, in response to the results of the first instance of the command via each interface not being identical, report an error.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
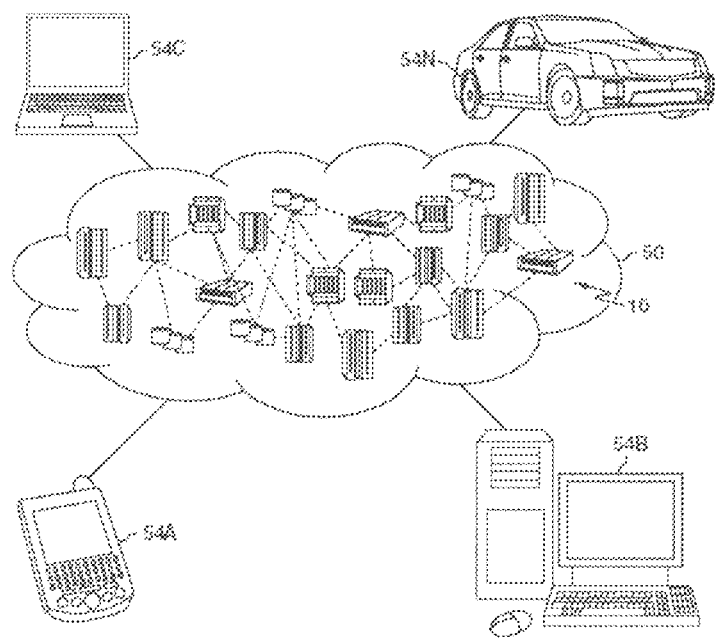
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
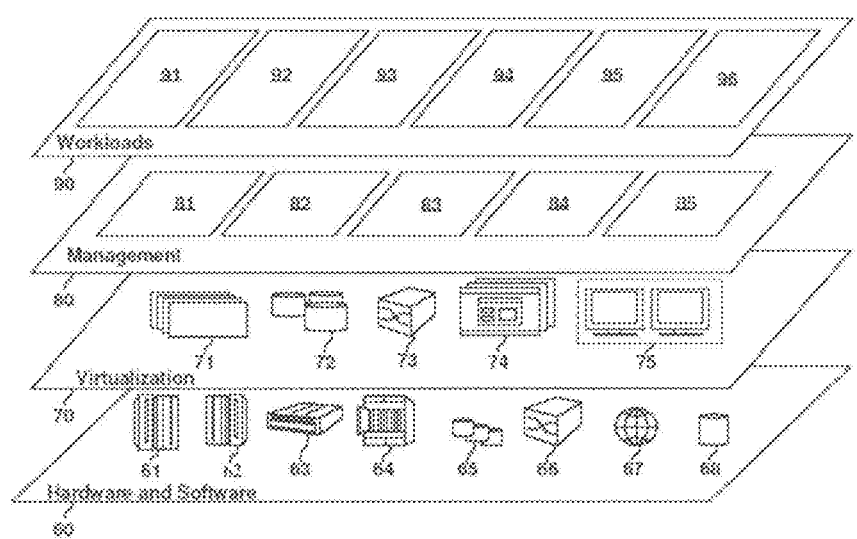
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing and analysis of customer feedback of applications 96.

Disclosed here are technical solutions for automated testing of a multi-interface virtualization management system, such as for an enterprise. The virtualization management system facilitates the enterprise, such as an organization, to deploy cloud-based computing management based dynamic infrastructure. The complexity and amount of work associated with system level testing of a multi-interface virtualization management system in a cloud-based computing infrastructure renders manual testing to become inefficient and costly as the system components and complexity increases. Further, the redundancy of execution time gets multiplied by the number of interfaces of the virtualization management system. For example, the system may have a Graphical User Interface (GUI), an Application Programming Interface (API), a Command Line Interface (CLI), or any other interface or a combination thereof. The technical solutions described herein overcome such limitations of manual testing and shorten the test cycle time, by providing a robust and automated multi-interface testing.

Figure 3:
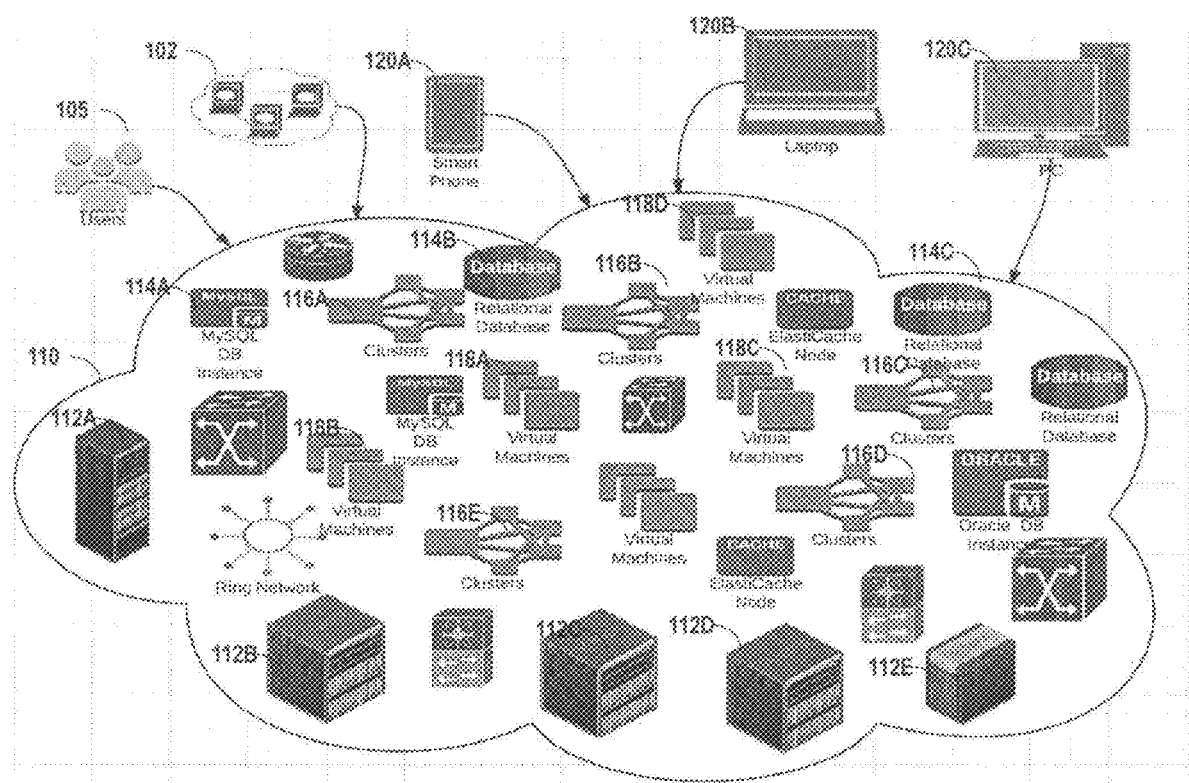
FIG. 3 illustrates an example virtualization management system in accordance with an embodiment.

FIG. 3 illustrates an example virtualization management system 102. The virtualization management system 102 provides a single point of management across multiple types of system platforms and their virtualization technologies. For example, as illustrated, the virtualization management system 102 manages a cloud-based infrastructure 110 of an enterprise. The cloud-based infrastructure 110 is a cloud computing environment 50 as described herein. For example, The cloud-based infrastructure 110, depending on size of the enterprise, includes one or more data servers 112A-112E, one or more database instances 114A-114C, one or more virtual machines 118A-118D, one or more clusters 116A-116E, and one or more computer network nodes, among other components. For example, the data servers 112A-112E may include an enterprise email server, a document server, a compute server, or any other server that provides data and/or computation functionality to users. The database instances 114A-114C may include an instance of a customer database, an instance of payroll database, or any other database. The clusters 116-116E may include physical or virtual computer clusters. For example, the clusters may include a HADOOP™ cluster, a SQL SERVER™ cluster, a MICROSOFT WINDOWS SERVER™ cluster, or any other cluster. The virtual machines 118-118D include a virtual machine that may is tasked for a particular operation, a virtual machine that is assigned to a particular user, or any other type of virtual machines.

Users 105 of the cloud infrastructure 110, access the cloud infrastructure 110 from within or from outside the cloud infrastructure 110. For example, a user may access the resources or components within the cloud infrastructure 110 via the virtual machine 118A. Alternatively, a user may access the components within the cloud infrastructure 110 via a client-device, such as one from client-devices 120A-120C. The client-devices may include a communication device such as a laptop, a tablet computer, a smartphone, a mobile phone, a desktop computer, or any other communication device.

The cloud infrastructure 110 may communicate with another cloud infrastructure. In an example, a user may request communication between the cloud infrastructure 110 and the other cloud infrastructure, for example to copy or move data from one place to another. The other cloud infrastructure may include similar or different components in comparison to the cloud infrastructure 110.

Thus, the virtual management system 120 facilitates communication with the cloud infrastructure 110 to varying types of devices and for various purposes. Accordingly, to facilitate communications for the various purposes, the virtual management system 102 provides multiple interfaces to communicate with the cloud infrastructure 110, such as a GUI, an API, a CLI, or any other interface or a combination thereof. For example, consider a cloud infrastructure of an organization that sells goods via the web. The data servers for the organization include information about goods for sale. A user, such as a customer, may access the data via the GUI. Another user, such as an employee of the organization may access the data via an API, such as to change the data programmatically. In another example, another user, such as another server from an advertiser may access the data via the API to access and post the information on a website or as a search result. In addition, a network administrator may access the data server via the CLI, for example to determine integrity of the server. Thus, the virtualization management system 130 provides multiple interfaces, at least three interfaces to facilitate communication.

In addition, the virtualization management system 102 facilitates managing the cloud infrastructure 110 from an administrative perspective. For example, the virtualization management system 102 manages images of Operating Systems (OS) that may be deployed across the cloud infrastructure 110. For example, the virtualization management system 102 orchestrates emulating scaled up versions of the cloud infrastructure 110 that supports arbitrary concurrent multi-end users. In an example, the virtualization management system 102 manages the OS images deployed throughout the cloud infrastructure 110. Managing the OS images includes deploying guest OS images, capturing guest OS images, importing virtual appliances (guest OS image), viewing or listing guest OS images, deleting guest OS images, and other such operations and a combination thereof. The virtualization management system 102 further scale and stress tests the image management repository by facilitating revision control, rebase (re-image), and advanced search for Virtual Appliances (VA's).

The virtualization management system 102 further manages system pools (clusters) in the cloud infrastructure 110. For example, the virtualization management system 102 creates, lists, removes, and edits data servers and storage system pools (storage clusters). The virtualization management system 102 also deploys images into server system pools by adding, listing, removing, and editing server hosts from server system pools (server clusters). In addition, the virtualization management system 102 adds, lists, removes, and edits storage subsystem hosts from storage system pools (storage clusters). The virtualization management system 102 also monitors server and storage system pools. Based on the monitoring, the virtualization management system 102 creates, lists, removes, and edits workloads of the clusters. For example, the virtualization management system 102 set workloads to High Availability (HA) and have automatically places jobs in system pools.

In addition, the virtualization management system 102 may facilitate updating firmware of the devices in the cloud infrastructure 110. The virtualization management system 102 may also be tasked with identifying and integrating new devices into the cloud infrastructure 110.

Thus, the virtualization management system 102 system is responsible for a multitude of tasks, and the virtualization management system 102 provides multiple interface to perform each of these tasks. Hence, system level testing of such multi-interface dynamic infrastructure where a complex customer change window takes place is challenging. The technical solutions described herein test the multi-interface virtual management system 102 using automated testing that includes stress-testing the cloud infrastructure 110 managed by virtualization management system 102.

Figure 4:
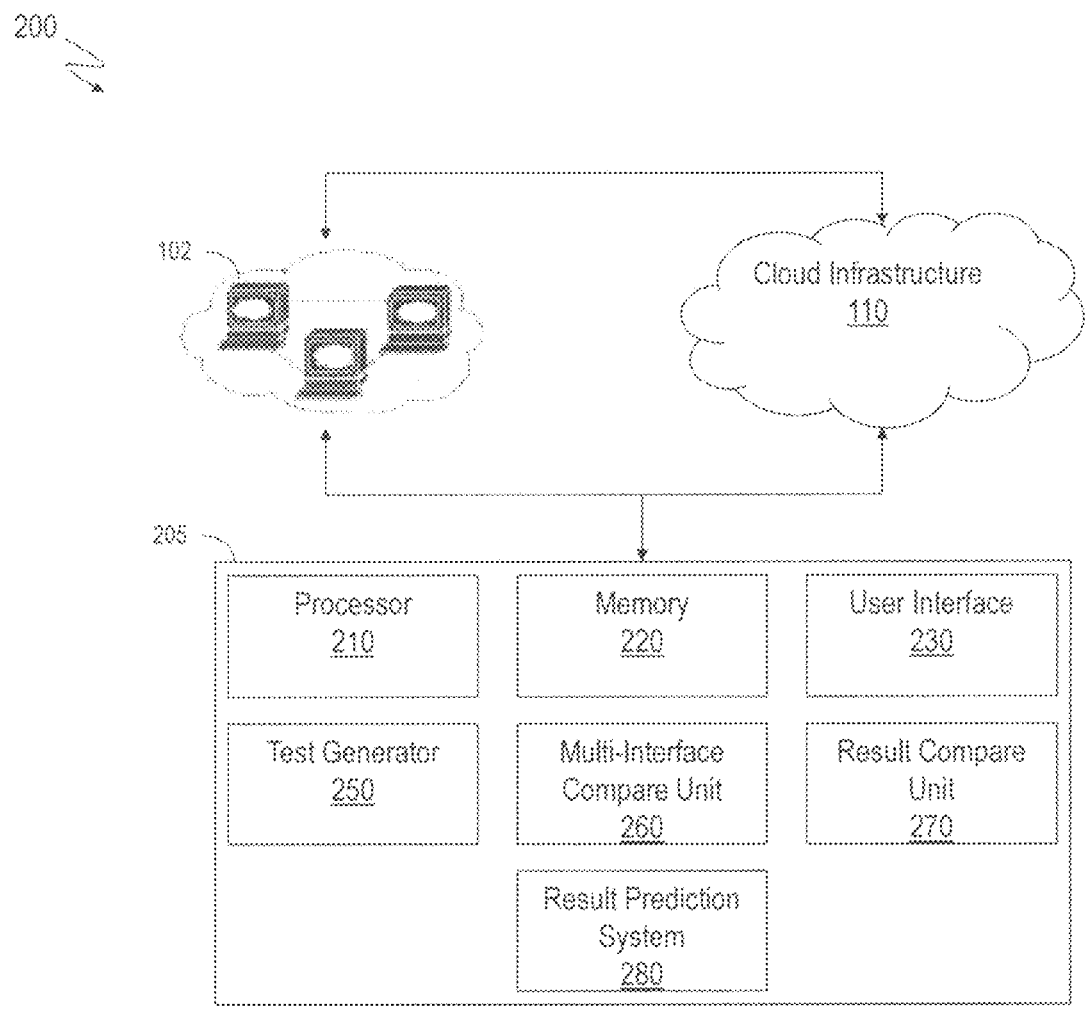
FIG. 4 illustrates an example test server in accordance with an embodiment.

FIG. 4 illustrates an example testing environment 200 for testing the virtualization management system 102 and the heterogeneous cloud infrastructure 110. The testing environment 200 includes a test server 205 that communicates with both the virtualization management server 102 and the cloud infrastructure 110. The test server 205 includes, among other components, a processor 210, a memory 220, a user interface 230, a test generator 250, a multi-interface compare unit 260, and a result compare unit 270. In an example, the test generator 250, the multi-interface compare unit 260, and the result compare unit 270 are program modules that include computer executable instructions that are executable by the processor 210.

The processor 210 may be a central processor of the test server 205, and may be responsible for execution of an operating system, control instructions, and applications installed on the test server 205. The processor 210 may be one or more devices operable to execute logic. The logic may include computer executable instructions or computer code embodied in the memory 220 or in other memory that when executed by the processor 210, cause the processor 210 to perform the features implemented by the logic. The computer code may include instructions executable with the processor 210. The computer code may include embedded logic. The computer code may be written in any computer language now known or later discovered, such as C++, C #, Java, Pascal, Visual Basic, Perl, HyperText Markup Language (HTML), JavaScript, assembly language, shell script, or any combination thereof. The computer code may include source code and/or compiled code. The processor 210 may be a general processor, central processing unit, server, application specific integrated circuit (ASIC), digital signal processor, field programmable gate array (FPGA), digital circuit, analog circuit, or combinations thereof. The processor 210 may be in communication with the memory 220 and the other components of the test server 205.

The memory 220 may be non-transitory computer storage medium. The memory 220 may be DRAM, SRAM, Flash, or any other type of memory or a combination thereof. The memory 220 may store control instructions and applications executable by the processor 210. The memory 220 may contain other data such as images, videos, documents, spreadsheets, audio files, and other data that may be associated with operation of the test server 205.

The test server 205 includes a user interface 230 that facilitates issuing commands to the test server 205. For example, a tester may initiate the testing by the test server 205 via the user interface 230.

Figure 5:
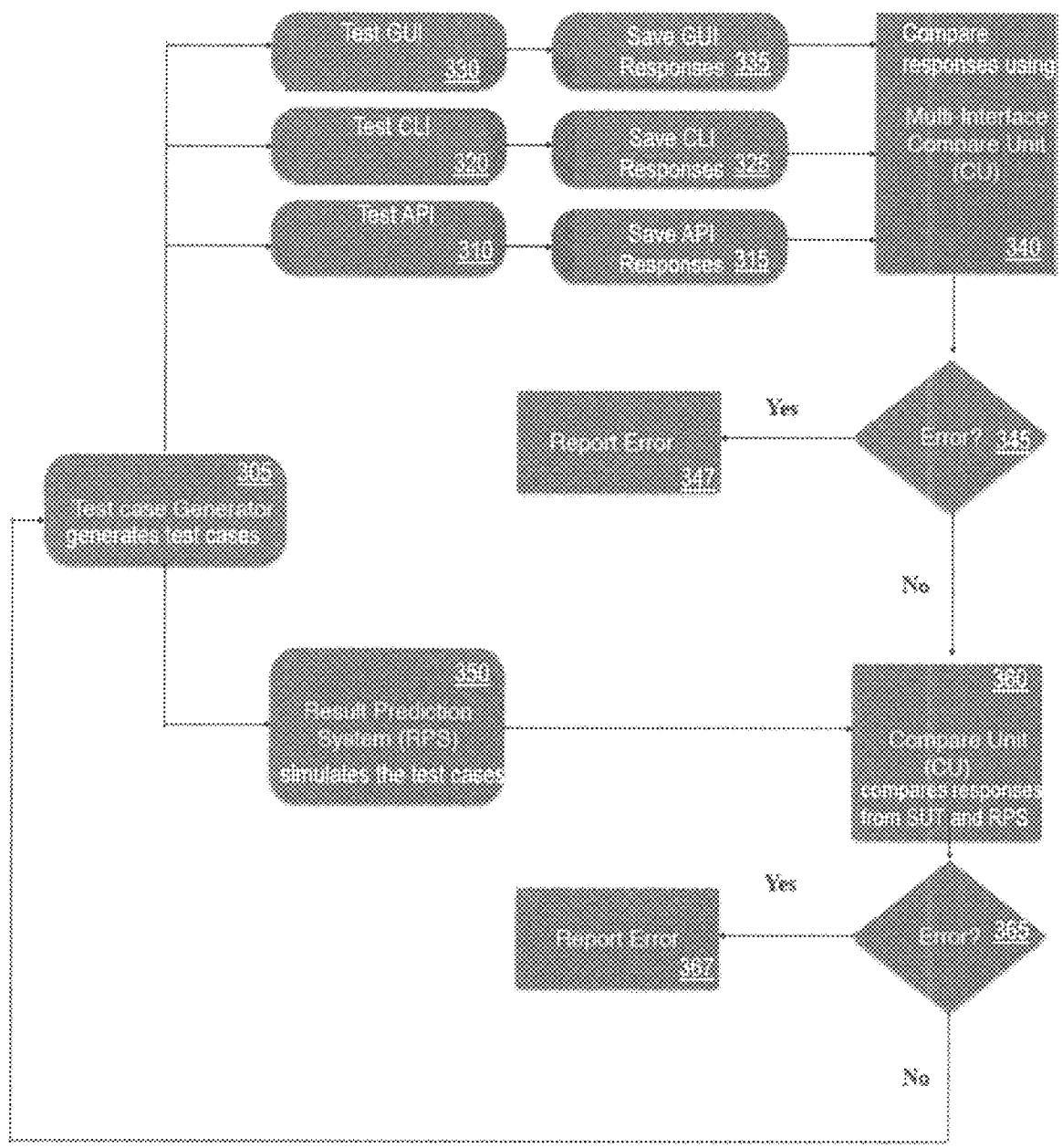
FIG. 5 illustrates a flowchart of example logic to automatically test a virtualization management system in accordance with an embodiment.

FIG. 5 illustrates example logic used by the test server 205 to test the virtualization management system 102. The test generator 250 generates test cases that stress, scale and performance test the virtualization management system 102, as shown at block 305. For example, the test generator 250 is a pseudo-random test case generator. In an example, the test generator 250 generates a random string of valid multi-interface functionalities where each function can appear within the string one or more times. The test generator 250 generates multiple such strings, each string being a separate test case. There are no dependencies among the generated functionalities in the strings and, therefore, the test case generation is allowed to include functionalities that could return bad return codes. For example, a multi-interface function "RemoveHost" may be the first command in the generated string. In this case, the machine is expected to respond a return code indicating that there are no hosts to be removed (since the first command is to remove a host without loading one).

The processor 210 sends the strings of multi-interface functions to both the System Under Test (SUT), which is the virtualization management system 102 that is being tested, and the result predictor 280 within the result predictor 280. Each test case tests multiple interfaces of the virtualization management system 102, as shown at blocks 310, 320, and 330. In the illustration, the GUI, the CLI, and the API of the SUT, that is the virtualization management system 102, are tested. The functions listed in the string of the test cases are implemented by the SUT via each of the interfaces. The test server 205 receives the results for the tests cases from the SUT from each of the interfaces tested, as shown at blocks 315, 325, and 335.

The result predictor 280 identifies the expected results for the generated test cases. For example, the result predictor 280 simulates the cloud infrastructure 110 under test and further simulates execution of the test cases, as shown at block 350. In an example, the result predictor 280 executes each test case for each of the multiple interfaces provided by the SUT. The simulation of each multi-interface function is based on the initial values as well as previously executed function. For example, if a number of consecutive multi-interface 'AddHost' functions are executed, the simulation unit keeps the list of unique and valid hosts that exist in the pool at any given time. The virtualization management system 102 uses Unique Object ID (UOID) or Global Unique ID (GUID) for each object in the cloud infrastructure 110, such as host servers. The test server 205 uses the UOID property to keep track of the valid hosts that exist in the pool (cluster).

The test server 205 captures and stores results from the result predictor 280 in response files. In an example, results from the multi-interface SUT are appended into the response files, after the results from the result predictor 280. Alternatively, the test sever 205 maintains two separate response files, one for results from the result predictor 280 and one for results from the SUT. In an example, for each possible function per interface, the test server 205 creates two files (response files) that are updated each time the function is executed. The results from the SUT and RPS are appended to their respective files.

The multi-interface compare unit 260 compares results from all the interfaces, as shown at block 340. The multi-interface compare unit 260 compares the actual results with expected results of the test case that was executed. Alternatively or in addition, the multi-interface compare unit 260 compares the results from each interface to determine if the results are identical. If the results are not identical, the multi-interface compare unit 260 determines and reports an error, as shown at blocks 345 and 347. In an example, the response file corresponding to the SUT is appended with results from the SUT only if the multi-interface compare unit 260 does not encounter an error.

The result compare unit 270 compares all the accumulated multi-interface expected results in the response file for the SUT to those returned by the result predictor 280, to determine respective outcomes of the test cases, as shown at block 360. For example, at the end of the test case execution, the response file(s) is (are) parsed to determine presence of keywords (such as UOID or GUID) for both the SUT and the result predictor 260. For example, in case of two files, one for each of the SUT and the result predictor 280, the result compare unit 270 scans both files to identify presence of a keyword. If the result compare unit 270 determines an error when scanning the results for a test case, then the test server 205 reports an error for the test case, as shown at blocks 365 and 367. For example, if an expected keyword response is not present in the file corresponding to the SUT, the file that contains actual results, and is present in the file corresponding to the RPS (or vice versa), then the test server 205 reports an error. Alternatively or in addition, the test server 205 reports an error if a response in the file for the SUT is different from a corresponding response in the file for the RPS. The test server 205 also reports an error if the results in the two files are the same, but do not match expected test results.

Thus, the multi-interface automated testing emulates and tests the virtualization management system 102 by executing an arbitrary mixture of multi-interface virtualization management functionalities in the heterogeneous cloud based infrastructure 110. For example, the test string may test a data server of the multi-interface virtualization management system 102 through a complex hostile environment that is anchored from server, storage, and network administrator perspective. Table 1 lists a possible sequence of operations to test the virtualization management system 102 in this manner.

TABLE 1

Figure 6:
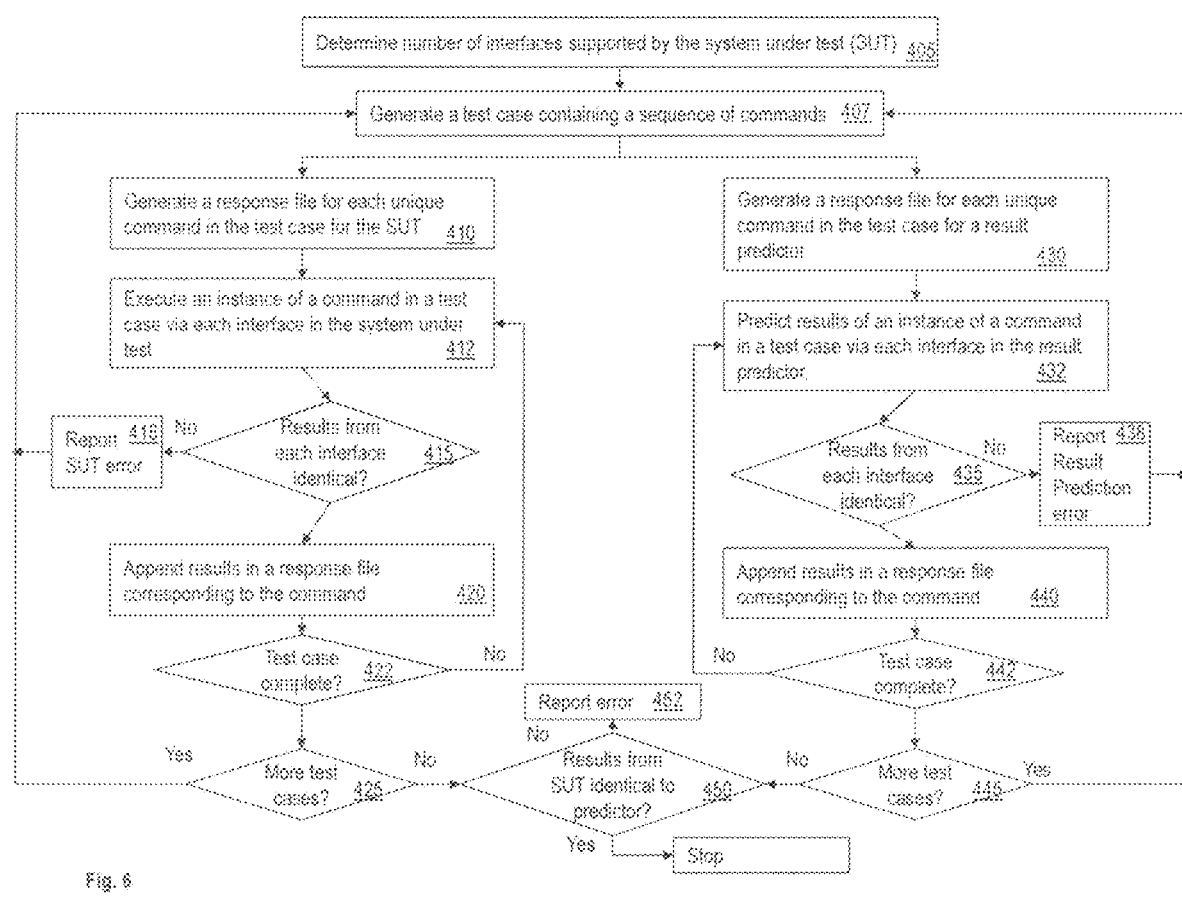
FIG. 6 illustrates a flowchart of example logic to automatically test a virtualization management system in accordance with an embodiment.

MIF = Multi-interface functions: A list of randomly generated multi-interface functions. Each function will have it's multi-interface versions generated such as GUI, CLI and API.
ARC[i] = ARC: actual (from the SUT) response of the $i_{th}$ function
ERC[i] = ARC: expected response of the $i_{th}$ function
1. Generate n number of multi-interface functions MIF; where n is a random number and MIF is list of generated multi-interface functions. Each generated function will consists of multiple versions of it's three interfaces (GUI, CLI, and API) supported.
2. For each multi-interface function mlf in MLF
   a. Execute all of it's multi-interface versions mlf on both the SUT and RPS
      i. Compare the outputs of each function interface (GUI, CLI, and API) versions
      ii. if no error continue on with next step b. Otherwise report on error for incompatible results between the different interfaces.
   b. append result to a ARC[mlf] and ERC[mlf]
3. For each ARC and ERC
   a. Compare (check keywords) all entries of ARC and ERC
   b. if no error continues to step 1 Otherwise report an error FIG. 6 illustrates example logic to test the virtualization management system 102. The logic may be implemented by the test server 205. The test server 205 determines the number of interfaces supported by the virtualization management system 102, as shown at block 405. In another example, a user may input the number of interfaces. The test server 205 generates one or more test cases, as shown at block 407. The test case includes a sequence of instances of commands executable by the virtualization management system 102.

The test server 205 generates a response file for each unique command in the test case. For example, the test server 205 generates a first response file corresponding to a command tested by the virtualization management system 102, and a second response file corresponding to the command tested by the result predictor 280, as shown at blocks 410 and 430. Each instance of the commands in the test case is executed by the virtualization management system 102 and the result predictor, via each interface, as shown at blocks 412 and 432. The test server 205 sends the test case to each interface that is supported by the virtualization management system 102. The test server 205 further sends the test case to the result predictor 280 to test each interface using the result predictor 280.

The test server compares the results from each interface of the virtualization management system, as shown at block 415. If the results from each interface are not identical, the test server 205 reports an error, as shown at blocks 418 and 417. For example, the error may be reported as an email, as a prompt on a display, an audible, or in any other manner.

Alternatively, if the results from each interface are identical, the results from the virtualization management system 102 is appended to the first response file corresponding to the virtualization management system, as shown at block 420. If all commands in the test case are not executed (i.e. tested), the test server 205 continues to test further instances of the commands in the test case, as shown at block 422. The test server 205 generates and tests other tests cases to completely test the virtualization management system, as shown at block 425.

The test server 205 compares the results from each interface of the result predictor 280, as shown at block 435. If the results from each interface are not identical, the test server 205 reports an error, as shown at block 438. For example, the error may be reported as an email, as a prompt on a display, an audible, or in any other manner. Alternatively, if the results from each interface are identical, the results from the result predictor 280 is appended to the second response file corresponding to the result predictor 280, as shown at block 440. If all commands in the test case are not executed (i.e. tested), the test server 205 continues to test further instances of the commands in the test case, as shown at block 442. The test server 205 generates and tests other tests cases to stress the virtualization management system, as shown at block 445. The test server 205 sends to the result predictor 280, all the test cases that were used to test the virtualization management system 102.

The test server 205 compares the results from the virtualization management system 102 and the results from the result predictor 280, as shown at block 450. For example, the test server 205 compares the results that are stored in the first response file and the second response file. If the results in the two files are not identical, the test server 205 reports an error, as shown at block 452. The test server 205 parses the response files to compare the results based on object identifiers that the test server 205 assigns to each object in the virtualization management system 102. For example, each server, each cluster, each virtual machine, or any other component in the cloud infrastructure 110 is assigned a unique identifier.

For example, assume that the test server 205 is testing the effect and results of the functions of AddHost (AH), RemoveHost (RH) and ListHost (LH) across multiple interfaces of the virtualization management system 102. Here, AH-x mean AddHost x and RH-y represent RemoveHost y. Consider that a generated random command string for a test case is RH-A→RH-D→LH→AH-C→LH→RH-C→LH. The test server 205 sends the command string to the SUT and the result predictor 280, which execute the commands listed in that sequence. The test server 205 receives the results after each command and appends the results to the respective response files.

Thus, the string is executed on the SUT and the result predictor 280. The multi-interface compare unit 260 compares the response from the multiple interfaces for each function for compatibility, to check if they all produce identical results. For example, the multi-interface compare unit 260 determines if the AddHost(H) versions of GUI, CLI, and API interfaces all report successful results. Subsequently, the response of the SUT to each function is parsed and checked for keywords such as UOID and GUID. The response is appended to the response file corresponding to the function for the SUT.

Figure 7:
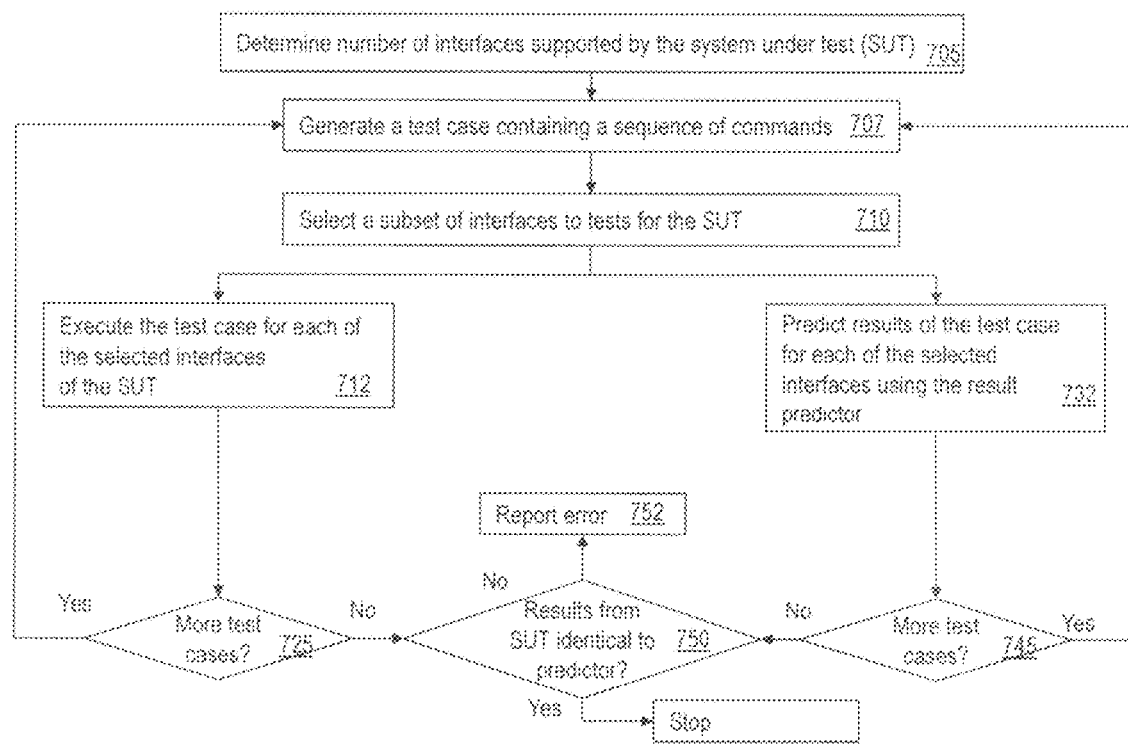
FIG. 7 illustrates a flowchart of example logic to automatically test a virtualization management system in accordance with an embodiment.

FIG. 7 illustrates a flowchart for testing the virtualization management system 102 according to another embodiment. The logic may be implemented by the test server 205. The test server 205 determines the number of interfaces supported by the virtualization management system 102, as shown at block 705. In another example, a user may input the number of interfaces. The test server 705 generates one or more test cases, as shown at block 707. The test case includes a sequence of instances of commands executable by the virtualization management system 102. The test server 205 selects a subset of the interfaces supported by the virtualization management system 102 that are to be tested. For example, the test server 205 tests only the GUI and the API of the virtualization management system 102, which additionally supports the CLI. Other combinations are of course possible. In an example, a user inputs the interfaces that are to be tested. The test server 205 executes the test case that was generated using each of the selected interface to be tested, as shown at block 712. The test server 205 executes the test case on the SUT to ensure that each selected interface returns an identical result, as described herein such as with respect to FIG. 6. The test server 205 generates a first response file for each command for the SUT as described herein. In addition, the test server 205 predicts results of the test case for each selected interface to be tested using the result predictor 280, as shown at block 732. Again, the test server 205 ensures that the results from each selected interface are identical using the result predictor, as described herein such as with respect to FIG. 6. The test server 205 generates a second response file for each command for the result predictor 280 as described herein. In case additional test cases are to be executed and/or predicted, the test server 205 repeats the above process, as shown at blocks 725 and 745. In an example, the user may indicate a maximum number of test cases that are to be used to test the virtualization management system 102. Alternatively, the maximum number of tests case may be a predetermined value or a randomly generated value in other examples.

Once the maximum number of test cases are completed, the test server 205 compares the results for each command from the SUT and the result predictor, as shown at block 750. For example, the test server 205 compares the results that are stored in the first response file and the second response file. If the results in the two files are not identical, the test server 205 reports an error, as shown at block 752. In this case, the first and second response files include results for each of the selected interfaces and not all of the interfaces that are supported by the virtualization management system 102.

In this particular example test case, the expected results are that the first two functionalities in the string return invalid return codes since there are no hosts to be removed from the pool. The list host function should indicate an empty set. The second LH function should indicate host C to be in the pool and the last LH function should show an empty list of pool since host C removed.

The result predictor 280 uses accumulated state of the pool and simulates results for each multi-interface function. For example, the result predictor 280 sets initializes a pool with an empty set of valid hosts in the pool. Accordingly, during simulation, the first two functions (RH) return invalid response codes since the pool is empty in both cases. The first LH function looks at the set of valid pool and finds it empty. The test server 205 collects and stores the response from the simulations by the result predictor 280 in a corresponding response file for the function.

The result comparison unit 270 parses the corresponding response files returned by the SUT and result predictor 280. The result comparison unit 270 checks that each entry pair of the response files is consistent and indicates proper (expected) results. Accordingly, the number of entries in each of the corresponding response files is the same for the results to match without an error. For example in this case, the LH response file in both, the SUT and the result predictor should include 9 (nine) entries (three entries*three interfaces), since the LH command was executed three times and the virtualization management system 102 in the example supports three interfaces (API, CLI, and GUI).

Thus, the technical solutions described herein facilitate testing multiple interfaces of a virtualization management system functionalities by orchestrating to emulate a scaled up cloud infrastructure that supports arbitrary concurrent multi end users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer-implemented method for testing interfaces, the method comprising:
    generating commands executable by a virtualization management system;
    executing, by a computer, the commands on the virtualization management system using at least three interfaces supported by the virtualization management system, each of the at least three interfaces being different, the at least three interfaces comprising a command line interface, a graphical user interface, and an application programming interface which are separate from one another, wherein executing the commands on the virtualization management system using the at least three interfaces comprises performing separate testing for the command line interface, the graphical user interface, and the application programming interface;
    comparing, by the computer, results of the execution for each of the at least three interfaces to determine whether the results of each of the at least three interfaces are identical;
    determining, by the computer, an error occurred when the results of each of the at least three interfaces are different; and
    storing, by the computer, the results when the results of each of the at least three interfaces are identical.

2. The computer-implemented method of claim 1, wherein each one of the at least three interfaces is operable to communicate with the virtualization management system.

3. The computer-implemented method of claim 1, wherein each one of the at least three interfaces is structured as a different form of communicating with the virtualization management system.

4. The computer-implemented method of claim 1, wherein the commands are for a test case.

5. The computer-implemented method of claim 1, wherein at least one of the commands is designed for each of the at least three interfaces.

6. The computer-implemented method of claim 1, wherein each of the at least three interfaces has a file for storing the results.

7. The computer-implemented method of claim 1, wherein each one of the at least three interfaces is structured as a different form of inputting instructions to the virtualization management system.

8. The computer-implemented method of claim 1, wherein the results are separate for the at least three interfaces of the command line interface, the graphical user interface, and the application programming interface.

9. The computer-implemented method of claim 1, wherein the commands comprise a string.

10. The computer-implemented method of claim 9, wherein the string comprises multi-interface functionalities.

11. A system for testing interfaces, the system comprising:
    a memory coupled to a processor, the processor configured to:
    generate commands executable by a virtualization management system;
    execute the commands on the virtualization management system using at least three interfaces supported by the virtualization management system, each of the at least three interfaces being different, the at least three interfaces comprising a command line interface, a graphical user interface, and an application programming interface which are separate from one another, wherein executing the commands on the virtualization management system using the at least three interfaces comprises performing separate testing for the command line interface, the graphical user interface, and the application programming interface;
    compare results of the execution for each of the at least three interfaces to determine whether the results of each of the at least three interfaces are identical;
    determine an error occurred when the results of each of the at least three interfaces are different; and
    store the results when the results of each of the at least three interfaces are identical.

12. The system of claim 11, wherein each one of the at least three interfaces is operable to communicate with the virtualization management system.

13. The system of claim 11, wherein each one of the at least three interfaces is a structured as a different form of communicating with the virtualization management system.

14. The system of claim 11, wherein the commands are for a test case.

15. The system of claim 11, wherein at least one of the commands is designed for each of the at least three interfaces.

16. The system of claim 11, wherein each of the at least three interfaces has a file for storing the results.

17. The system of claim 11, wherein each one of the at least three interfaces is structured as a different form of inputting instructions to the virtualization management system.

18. The system of claim 11, wherein the at least three interfaces comprise of a command line interface, a graphical user interface, and an application programming interface.

19. A computer product for testing interfaces, the computer product comprising a computer readable storage medium having program instructions embodied therewith, the program instructions executable by the computer to cause the computer to:
    generate commands executable by a virtualization management system;
    execute the commands on the virtualization management system using at least three interfaces supported by the virtualization management system, each of the at least three interfaces being different, the at least three interfaces comprising a command line interface, a graphical user interface, and an application programming interface which are separate from one another, wherein executing the commands on the virtualization management system using the at least three interfaces comprises performing separate testing for the command line interface, the graphical user interface, and the application programming interface;

compare results of the execution for each of the at least three interfaces to determine whether the results of each of the at least three interfaces are identical;

determine an error occurred when the results of each of the at least three interfaces are different; and store the results when the results of each of the at least three interfaces are identical.

20. The computer program product of claim 19, wherein each one of the at least three interfaces is operable to communicate with the virtualization management system.

* * * * *